United States Patent [19]

Blackington

[11] Patent Number: 4,528,617

[45] Date of Patent: Jul. 9, 1985

[54] LIGHT DISTRIBUTION APPARATUS

[75] Inventor: Paul A. Blackington, Vandling, Pa.

[73] Assignee: Sheltered Workshop for the Disabled, Inc., Binghamton, N.Y.

[21] Appl. No.: 576,313

[22] Filed: Feb. 2, 1984

Related U.S. Application Data

[63] Continuation of Ser. No. 346,723, Feb. 8, 1982, abandoned.

[51] Int. Cl.³ .................................................. F21V 7/04
[52] U.S. Cl. ......................................... 362/32; 362/339
[58] Field of Search ..................... 362/31, 32, 240, 339

[56] References Cited

U.S. PATENT DOCUMENTS

| | | | |
|---|---|---|---|
| 3,761,704 | 9/1973 | Takeichi et al. | 362/339 X |
| 4,124,879 | 11/1978 | Schoemer | 362/32 X |
| 4,128,298 | 12/1978 | McMillan | 362/32 X |
| 4,234,914 | 11/1980 | Boesen | 362/240 |
| 4,257,084 | 3/1981 | Reynolds | 362/31 |
| 4,277,817 | 7/1981 | Hehr | 362/31 |
| 4,323,951 | 4/1982 | Pasco | 362/31 X |
| 4,387,414 | 6/1983 | Hensleigh | 362/31 |

FOREIGN PATENT DOCUMENTS

| | | | |
|---|---|---|---|
| 2722470 | 11/1978 | Fed. Rep. of Germany | 362/31 |
| 525515 | 1/1954 | France | 362/31 |

*Primary Examiner*—Tony M. Argenbright
*Attorney, Agent, or Firm*—Richard G. Stephens

[57] ABSTRACT

Compact devices for distributing light from a small area source to evenly light a larger area each comprise a member having a first plurality of surfaces which intercept respective slices of a light beam extending in a first direction and internally reflect the slices to a second substantially perpendicular second direction. A second plurality of surfaces intercept respective portions of the slices of light travelling in the second direction and internally reflect those portions generally perpendicularly toward an output surface to evenly light the output surface.

15 Claims, 12 Drawing Figures

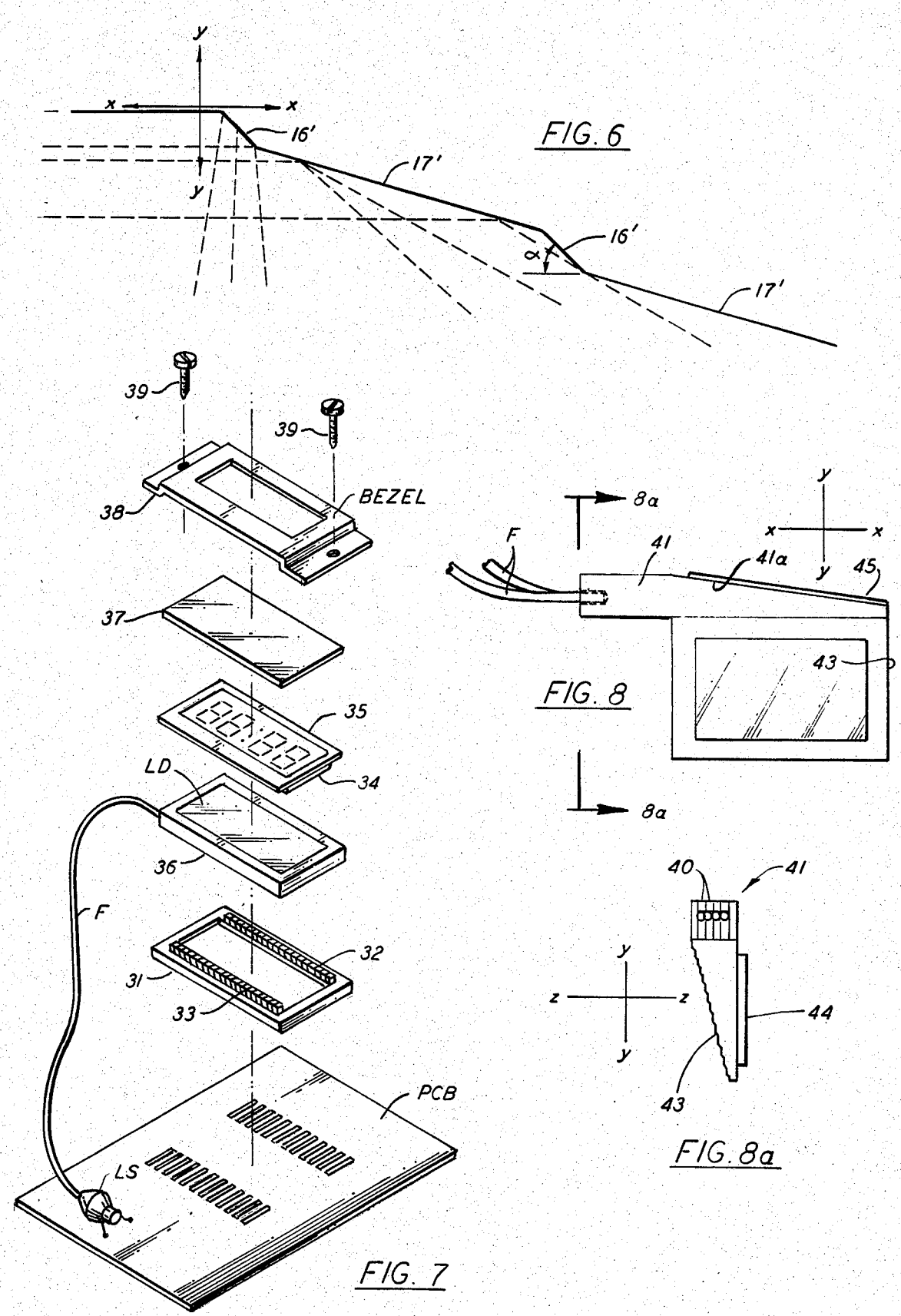

LIGHT DISTRIBUTION APPARATUS

This application is a continuation of my prior copending Application Ser. No. 346,723 filed Feb. 8, 1982, now abandoned.

This invention relates to apparatus for distributing light from a source over an area. In a wide variety of applications it is necessary or desirable that light be distributed over a substantial area, but difficult or undesirable to locate a conventional light source adjacent to the area. For example, it may be desirable to back-light an LCD (liquid crystal display), but undesirable for various reasons to place a fluorescent lamp, electroluminescent panel or similar device behind the LCD. In various applications the use of conventional light sources is undesirable for different reasons, such as lack of space, the susceptibility of such a course to a magnetic or electric field, or to shock or vibration. In some applications the cost of a high voltage supply auxiliary apparatus needed to operate a light source precludes its use. In some applications the heat generated by a light source renders its use undesirable.

It is well known that various disadvantages attending use of a light source adjacent an area to be lighted may be overcome by remote location of the light source, with light from the source conducted to the region to be lighted by means of an optical fiber, or a cable formed of plural optical fibers. However, the exit end of an optical fiber acts as a light source having an undesirably small diameter for many applications, and the spread of light exiting from a fiber end, which spread depends on the numerical aperture of the fiber, is too slight or gradual for some applications, requiring that a surface to be lighted be located further than may be desired from the end of the fiber. Further, light exits from a conventional fiber of circular cross-section in a conical pattern, and it is often desired instead that a region of square or rectangular shape be lighted. Thus one specific object of the invention is to provide apparatus for distributing light exiting from one or more optical fibers over a substantial area.

The invention is useful not only to distribute light exiting from the ends of optical fibers, but also to distribute light from various other devices, such as small incandescent lamps, and hence a more general object of the invention is to provide improved apparatus for distributing light from a small source area over a larger output area. Some further objects of the invention are to provide compact apparatus which will provide even distribution of light, and which is simple, reliable and inexpensive.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 2a is an enlarged view of a portion of edge 14 in FIG. 1a.

FIG. 6 is a view similar to FIG. 2a illustrating several modifications which may be made to the invention.

FIG. 7 is an exploded view illustrating use of the invention to backlight a conventional liquid crystal display.

FIG. 8 is a front view of a modified form of the invention, and FIG. 8a is an end view of the device of FIG. 8 taken at lines 8a—8a in FIG. 8.

Figure 1A:
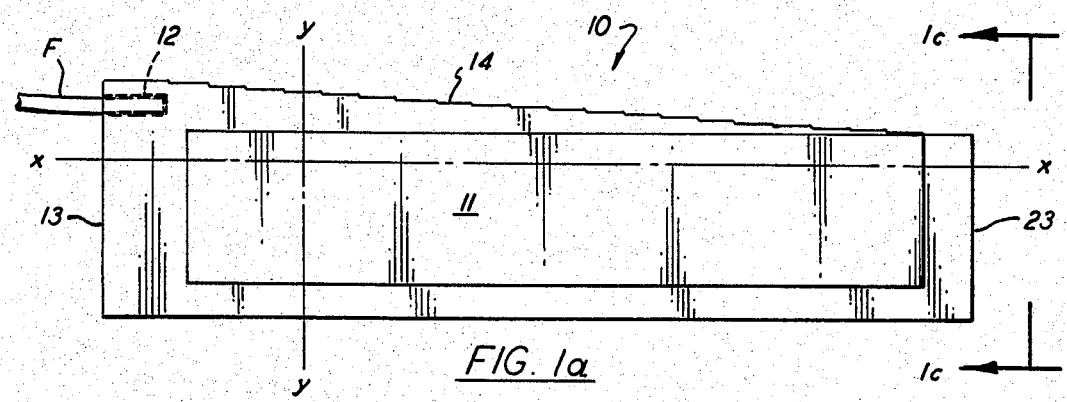
FIGS. 1a and 1b are front and rear views, respectively, of one form of the invention.
Figure 1B:
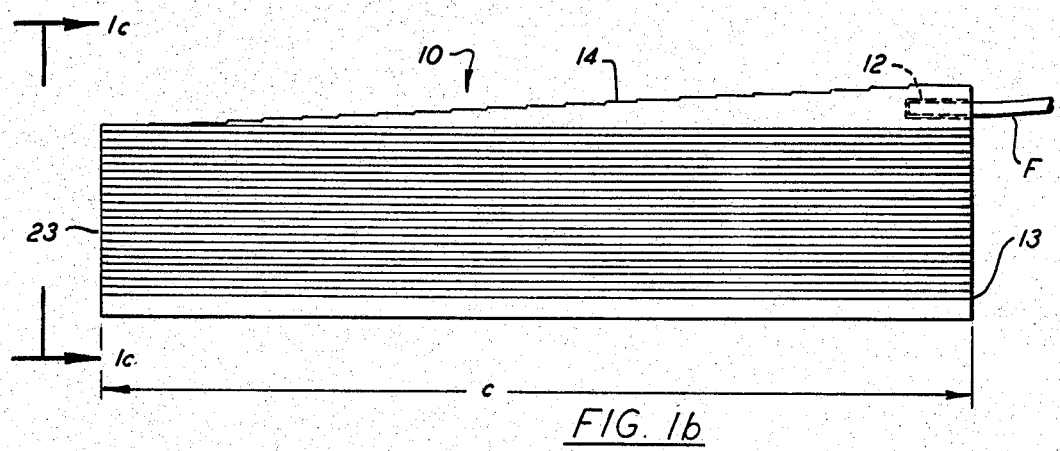
Figure 1C:
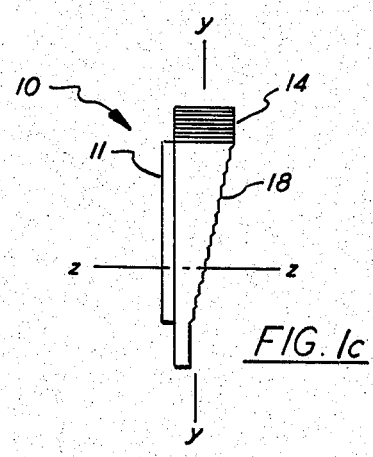
FIG. 1c is an end elevation view taken at lines 1c—1c in either FIG. 1a or FIG. 1b.

FIGS. 1a, 1b and 1c illustrate one simple embodiment of the invention. An integral diffuser and distributor block 10 preferably formed of a transparent plastic, such as an acrylic or polystyrene, has a rectangular boss portion having a generally planar front surface 11 which is lighted by light introduced into diffuser member 10 from an optical fiber F cemented into a recess 12 formed in end 13 of the block. The boss having front surface 11 need not necessarily be rectangular, though provision of generally rectangular lighted areas will be desired for various applications, such as back-lighting LCD displays. The rectangular boss may be fitted into a rectangular hole in a panel or frame (not shown).

The axis of the end of fiber F extends substantially parallel to a length-wise axis denoted x—x. Member 10 has a generally tapering upper edge 14, the character of which is more precisely seen by reference to FIG. 2a, wherein upper edge 14 may be seen to comprise a series of successive surfaces 16, 16 each arranged at a 45° angle to the x axis, separated by intermediate surfaces, such as those shown at 17, which are parallel to the x axis. The surfaces 16, 16 and 17, 17 each also extend parallel to a z—z axis (FIG. 1c), which extends normal to the paper in FIGS. 1a and 1b. The x—x, y—y and z—z axes are mutually perpendicular. Thus the surfaces 16, 16 are spaced apart from each other in the x direction, but are adjacent to each other in the y direction, and with the lower edge of one surface 16 at the same y location as the upper edge of the next surface 16 they are contiguous to each other in the y direction. Further, the surfaces 16, 16 are mutually parallel, extending obliquely to the x direction at the 45° angle shown, and extending in the z direction.

Figure 2A:
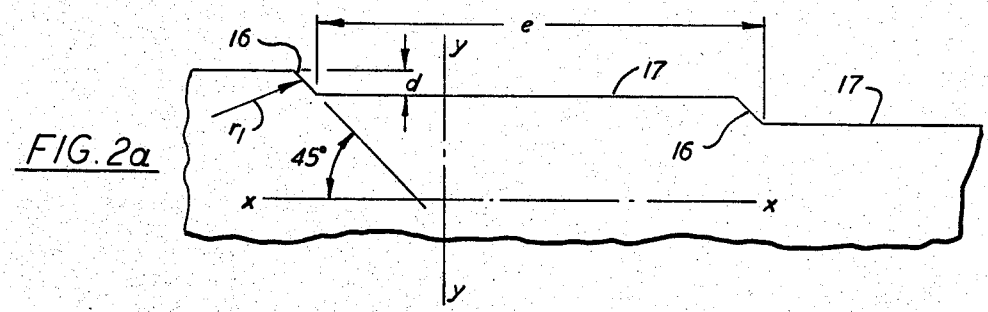

In one satisfactory embodiment of the invention, the dimensions d and e shown in FIG. 2a were 0.005 inch (0.127 mm.) and 0.1 inch (2.54 mm.), respectively. The dimension c was about 2.64 inches (6.7 cm.), so that more than twenty surfaces 16, 16 were provided along edge 14. Each surface 16 will be seen to intercept a different respective slice of the beam of light from fiber F.

The beam of light exiting from the end of fiber F passes generally in the x direction, generally rightwardly as viewed in FIG. 1a, and successive slices of the beam are reflected downwardly, generally parallel to the y—y axis, by total internal reflection, as they strike respective ones of the surfaces 16, 16 arranged obliquely, at a 45° angle, to the x axis. It will be understood that the light rays striking a given surface 16 are not collimated; hence not all rays of the slice of the beam reflected by the given surface will be redirected precisely in the y direction, and instead, some rays of each slice will have an x component, so that each slice reflected by a surface 16 spreads somewhat in the x direction as it passes downwardly through the distributor member. That spreading will be seen to help distribute the light to x locations in the distributor lying in between the surfaces 16, 16.

The material used to form the distributor should have an index of refraction exceeding 1.41, so that rays striking its surfaces at angles of incidence exceeding 45° will be totally internally reflected. With the plastic material having an index of refraction of about 1.47, each ray of light which strikes a surface 16 with an angle of incidence greater than about 43° will be totally internally reflected. A few rays which have an upward component, such as that shown at $r_1$ in FIG. 2a, for example, will have an angle of incidence less than 43° and they will be transmitted outside the diffuser. The further a surface 16 is from the end of fiber F, the more likely it is that rays incident upon it extend substantially parallel to axis x—x, and hence appreciable light tends to escape only at a few of the surfaces 16 near the fiber end. Light tending to escape through surfaces 16 can be reflected back into the diffuser using an external reflector (not shown), as will be explained below. By spacing the surfaces 16 along substantially the entire length of edge 14, light from the fiber will be seen to be distributed along substantially the entire length of diffuser 10.

Figure 2B:
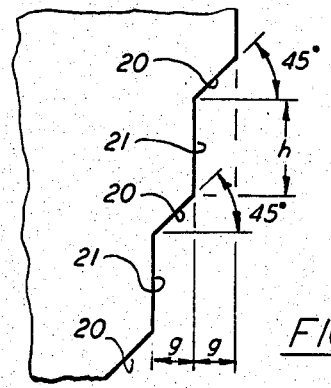
FIG. 2b is an enlarged view of a portion of side 18 in FIG. 1c.

As shown in FIG. 1c, block 10 also varies in thickness in the vertical direction. The rear side 18 of block 10 is provided with a plurality of surfaces of a type best seen in FIG. 2b. A plurality of mutually-parallel surfaces 20, 20 are spaced apart from each other in the y direction and adjacent to each other in the z direction, and in FIG. 2b they are shown contiguous to each other in the z direction, the surfaces 20, 20 are arranged to extend parallel to the x—x axis and obliquely, at an angle of 45° relative to the y—y axis, with surfaces 21, 21 each parallel to the x—x and y—y axes and located intermediate a respective pair of the surfaces 20, 20. In the mentioned satisfactory embodiment of the invention, the dimensions shown at g and h in FIG. 2b were 0.010 inch (1.254 mm.) and 0.040 inch (1.015 mm.) respectively. As any given slice of the light beam which has been reflected downwardly by a given one of surfaces 16 on edge 14 passes downwardly, generally in the y direction, successive portions of that slice are reflected (rightwardly as viewed in FIG. 2b) by respective ones of the surfaces 20, 20, again by total internal reflection, directing the light generally in the z direction, i.e. generally parallel to the z—z axis, and generally perpendicularly toward the output or front surface 11. A given surface 20 will be seen to reflect respective portions of each of the downwardly traveling slices of the light beam. Thus light is distributed vertically over the surface 11 by internal reflections from surfaces 20, as well as being distributed along the length of member 10 by internal reflections from surfaces 16.

The uniformity of light distribution on output surface 11 is increased by use of many small oblique surfaces 16 and 20 on edge 14 and side 18 of the diffuser block 10. The number and sizes of the oblique surfaces may vary widely, of course, in different applications, depending upon the size of the surface area to be lighted, and upon the uniformity or evenness of lighting desired. The surface 11 may be roughened, as by sandblasting, for example, to provide further diffusing at that surface.

In the device of FIGS. 1a-1c, the dimesions d and e are assumed to be uniform along the length of the diffuser 10, and in many applications that arrangement will be deemed satisfactory. It is within the scope of the invention, however, to increase the dimension d for surfaces 16 more remote from the fiber, to deflect more light downwardly from larger surfaces 16 to compensate for light loss occurring along the diffuser, and thereby provide better uniformity of lighting.

With the surfaces 17, 17 in FIG. 2a shown extending parallel to the x—x axis, the slice of the light beam intercepted by the leftside surface 16 will be contiguous with the slice intercepted by the rightside surface 16. If surfaces 17, 17 in FIG. 2a were to slope sufficiently downwardly to the right, as illustrated by surfaces 17', 17' in FIG. 6a, it will be appreciated that a slice of the light beam in between the two slices intercepted by the surfaces 16', 16' in FIG. 6a, would not be intercepted by a surface 16', but instead reflected insufficiently downwardly. In FIG. 6 if the angle $\alpha$ for a surface 16' is decreased to a value less than 45°, thereby to increase the angles of incidence of rays traveling generally in the direction of the x—x axis, the slice of light intercepted by such a surface also will be directed less downwardly and more rightwardly. Either of these techniques, and variation in the sizes and spacings of surfaces 16, may be used to modify the distribution of light in different applications.

Figure 3:
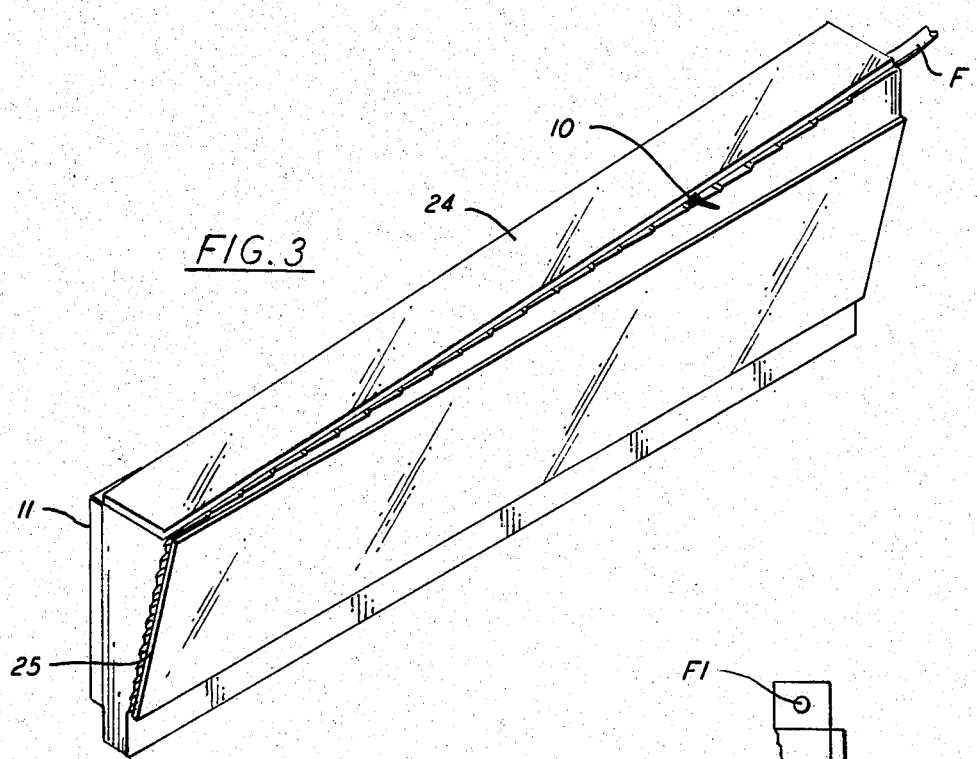
FIG. 3 is a perspective view illustrating the device of FIGS. 1c—1c with a pair of external reflector strips affixed to it.

Light exits from fiber F in the form of a spreading beam, with the result that small amounts of light will not be internally reflected by a surface 16 in FIG. 2a, but instead tend to be transmitted outside the diffuser through edge 14, as mentioned above. That light loss can be avoided by provision of an external reflector. Similarly, small amounts of light which otherwise might escape from the rear side 18 of the device can be returned to the device using a suitable reflector. In FIG. 3, a device similar to that of FIGS. 1a-1c is provided with reflecting strips 24 and 25 covering edge 14 and rear side 18 for such purposes.

Figure 4:
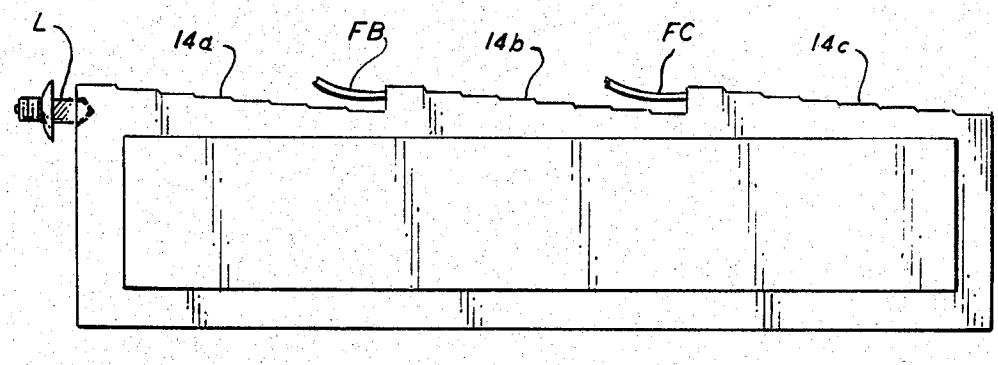
FIG. 4 is a view similar to FIG. 1a illustrating a modified form of the invention.

It is by no means necessary that light be introduced into the diffuser solely at a single location, nor is it necessary that light introduced into the diffuser emanate from specifically an optical fiber or a cable formed of optical fibers. FIG. 4 is a view similar to FIG. 1a illustrating a modified form of diffuser wherein three edges 14a, 14b and 14c, each similar to edge 14 of FIG. 1a, are provided. The stepped edge 14a is arranged to reflect slices of the light emanating from a lamp L cemented to the diffuser thereshown, while the edges 14b and 14c similarly are each arranged to receive light from a respective optical fiber FB or FC. The rear side of the device of FIG. 4 may be constructed identically to the device shown in FIGS. 1a-1c. By use of repeating stepped edges as illustrated in FIG. 4, lighted areas having practically unlimited x dimensions can be provided.

Figure 5:
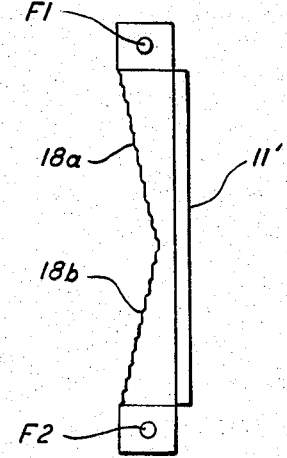
FIG. 5 is an end view similar to FIG. 1c illustrating a further modified form of the invention.

When a strip area is to be illuminated, it often becomes convenient to apply light to the distributor with an arrangement of the nature depicted in FIG. 5, wherein the diffuser thereshown can be envisioned as a mirror-image doubling of the device of FIGS. 1a-1c. Light inserted into the device via optical fiber F1 passes along the length of the diffuser, normal to the paper in FIG. 5, with successive slices of it being internally reflected downwardly, and with successive portions of those slices of light being internally reflected by surfaces at 18a to light the upper half of surface 11'. Similarly, light inserted via optical fiber F2 passes along the length of the diffuser, with successive slices of it being internally reflected upwardly, and with successive portions of those slices of light also being internally reflected rightwardly by surfaces at 18b to light the lower half of surface 11'.

The exploded view of FIG. 7 illustrates an application of the invention to back-light a conventional LCD display. A conventional circuit board-to-LCD connector 31 mounted on circuit board PCB comprises an open rectangular frame having two multi-conductor connector strips 32, 33, which connect conductors on the circuit board to conductors on the lower plate 34 of a liquid crystal display comprising plates 34 and 35. Because of its modest thickness a light distributor LD generally of the type described in connection with FIG. 1a–1c carried in a plastic frame 36 may be fitted within the open frame in between the connector strips, with the LCD plates lying atop the output surface of the distributor. A conventional front polarized plate 37 covers the upper plate 35 and a bezel 38 holds all the mentioned parts in place on the circuit board by means of screws 39, 39. A light source LS mounted on the circuit board applies light through optic fiber F to the light distributor LD. A slot (not shown) is provided in the end of frame 31 to allow fiber F to connect to distributor 36.

It should be noted that the invention is applicable to a wide variety of applications, such as illuminating dashboard or control panel signs in automotive, aircraft and instrumentation applications. Indicia may be printed or otherwise carried on the output surface of the distributor so that it remains generally not visible until light be applied to the distributor. Distributors constructed in accordance with the invention can even be used as directional signal indicators or parking lights on automotive vehicles.

In a modified form of diffuser illustrated in FIGS. 8 and 8a, a plurality of thin strips 40, 40 of transparent acrylic sheet are cemented together to provide an upper member 41 shown having a smoothly tapering upper edge 41a. Slots provided in the edges of a group of adjacent strips provide an opening which accommodates the ends of a plurality of optical fibers, f, f arranged in a row. Member 41 is cemented atop a generally wedge-shaped lower member 43, which is provided with stepped rear surfaces similar to those provided at 18 on the device of FIGS. 1a–1c, and provided with an output surface 44 similar to surface 11 in FIGS. 1a–1c. Operation of the device of FIGS. 8–8a is generally similar to that of the device of FIGS. 1a–1c, except that light traveling in the x direction along a given strip 41 remains in that strip rather than spreading in the z direction, and the use of a smooth taper at 41a instead of discrete 45° surfaces allows more light to escape through edge 41a. In FIG. 8 a thin reflective strip 45 is cemented atop edge 41a to reflect escaping light back into member 41.

The window area 11 and light diffuser 18 can be constructed by laminating rectangular light guides for the upper member 41.

The diffuser members constructed according to the invention are preferably formed of plastic and formed by injection molding, though it is within the scope of the invention to form such members using glass.

While terms such as "vertical", "upward" and "downward" have been used herein to facilitate explanation, it will be apparent that diffusers constructed according to the invention can be mounted in any position.

In the device of FIG. 3, rather than using external reflectors such as 24 and 25, an external refractor-reflector type surface can be used. Mirrored surfaces mating with the steps along edge 14 and side 18 can be provided.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A light distributor for distributing light received from a source of small area over an output surface of greater area, comprising a transparent member having a first plurality of mutually-parallel surfaces spaced apart from each other in a first direction, spaced adjacent each other in a second direction perpendicular to said first direction, and extending obliquely to said first direction and in a third direction perpendicular to said first and second directions, so that said surfaces of said first plurality may intercept respective slices of a beam of light applied from said source to said member in said first direction and internally reflect said slices of said beam generally in said second direction, a second plurality of mutually-parallel surfaces spaced apart in said second direction, spaced adjacent each other in said third direction, and extending obliquely to said second direction and in said first direction, so that said surfaces of said second plurality may intercept respective portions of said slices of said beam and internally reflect said portions generally in said third direction substantially perpendicularly onto said output surface, said output surface extending in said first and second directions.

2. The distributor of claim 1 in which said surfaces of said first plurality extend obliquely to said first direction at an angle of substantially 45 degrees, whereby rays of said beam extending in said first direction strike said surfaces of said first plurality with an angle of incidence of substantially 45 degrees.

3. The distributor of claim 1 in which said surfaces of said second plurality extend obliquely to said second direction at an angle of substantially 45 degrees, whereby rays of said slices extending in said second direction strike said surfaces of said second plurality with an angle of incidence of substantially 45 degrees.

4. The distributor of claim 1 wherein said source comprises an optical fiber and said distributor includes means for receiving an end of said optical fiber.

5. The distributor of claim 1 wherein said output surface is roughened to diffuse light transmitted from said output surface.

6. The distributor of claim 1 having reflector means covering at least some of said surfaces of said first plurality to reflect light escaping from said surfaces back into said member.

7. The distributor of claim 1 having reflector means covering at least some of said surfaces of said second plurality to reflect light escaping from said surfaces back into said member.

8. The distributor of claim 1 wherein the transparent material forming said member has an index of refraction exceeding 1.41.

9. The distributor of claim 1 wherein said surfaces of said first plurality are spaced contiguous to each other in said second direction.

10. The distributor of claim 1 wherein said surfaces of said second plurality are spaced contiguous to each other in said third direction.

11. A light distributor comprising a transparent member having means for coupling said member to a light source to receive a beam of light exiting from said source, a first plurality of surfaces spaced apart in a first direction on said member to intercept respective slices of said beam and to internally reflect said slices generally in a second direction substantially perpendicular to said first direction, an output surface, and a second plurality of surfaces spaced apart on said member in said second direction to intercept respective portions of said slices and to internally reflect said portions of said slices of said light beam generally in a third direction perpendicular to said first and second directions generally perpendicularly onto said output surface.

12. The distributor of claim 11 having a third plurality of surfaces all spaced in said first direction from said surfaces of said first plurality and spaced apart from each other in said first direction on said member to intercept respective slices of a second beam of light and to internally reflect said slices of said second beam generally in said second direction, and means for applying said second beam of light to said member for interception by said third plurality of surfaces.

13. The distribution of claim 11 having a third plurality of surfaces spaces on said member in said second direction from said surfaces of said first plurality and spaced apart in said first direction to intercept respective slices of a second beam of light and to internally reflect said slices of said second beam in a direction generally opposite to the direction in which slices are reflected by said first plurality of surfaces, and a fourth plurality of surfaces spaced apart on said member in said second direction to intercept respective portions of the slices reflected by said third plurality of surfaces and to internally reflect said portions onto said output surface.

14. A light distributor comprising a first wedge-shaped element formed of transparent material, said element having a thickness decreasing in a first direction and a first surface arranged at an acute angle to said first direction, means for applying a beam of light extending in said first direction into said member, whereby different portions of said beam are internally reflected from said first surface generally in a second direction, and a second element located adjacent said first element in said second direction, said second element having a plurality of surfaces spaced aparton said second member to intercept respective portions of the light reflected by said first surface and to internally reflect said portions generally in a third direction onto an output surface on said second element.

15. The distributor of claim 14 having reflector means covering at least a portion of said first surface to reflect light passing through said first surface back into said first element.

* * * * *